United States Patent [19]

Sullivan et al.

[11] Patent Number: 4,868,541
[45] Date of Patent: Sep. 19, 1989

[54] U-TURN SIGNAL DEVICE

[76] Inventors: Maureen A. Sullivan, 26732 Crown Valley Pkwy., No. 111, Mission Viejo, Calif. 92691; Elizabeth A. Himelson, 24953 Paseo de Valencia, No. 8C, Laguna Hills, Calif. 92653

[21] Appl. No.: 195,593
[22] Filed: May 18, 1988
[51] Int. Cl.⁴ .............................. B60Q 1/26
[52] U.S. Cl. ............................ 340/465; 340/464; 116/137 A
[58] Field of Search ............. 340/74, 87, 94, 95, 340/97, 107; 181/139, 141; 116/2, 137 A

[56] References Cited

U.S. PATENT DOCUMENTS

| | | | |
|---|---|---|---|
| 3,656,104 | 4/1972 | Samra | 340/97 X |
| 3,678,457 | 7/1972 | Lev | 340/103 C |
| 4,361,828 | 11/1982 | Hose | 340/107 |
| 4,387,361 | 6/1983 | Reed | 340/107 X |

Primary Examiner—Joseph A. Orsino
Assistant Examiner—Jeffery A. Hofsass
Attorney, Agent, or Firm—I. Michael Bak-Boychuk

[57] ABSTRACT

An aftermarket signaling system for use in an automobile including one, or more, manually powered ultrasonic sending units and an ultrasonic receiver which may be adhesively mounted in the automobile. The receiver includes a solar panel for recharging its own power supply and a set of lighted displays which are enabled by the ultrasonic signals from the sending units. The receiver may be mounted at the rear window of the vehicle and will thus provide visual signals to the following traffic.

4 Claims, 3 Drawing Sheets

U-TURN SIGNAL DEVICE

BACKGROUND OF THE INVENTION

1. Field of the Invention

The present invention relates to automotive signaling devices, and more particularly to an after-market signaling assembly for signaling rearwardly the prospective U-turn of a motor vehicle.

2. Description of the Prior Art

While the statistical incidence of U-turns as opposed to left-hand turns in the course of operation of a motor vehicle is extremely rare, the incidence of motor collisions while making a U-turn is extremely high. For this reason most local ordinances control the frequency of U-turns in any stream of traffic with some rigor. Nonetheless, practicality dictates that some U-turns be permitted, particularly where the roadway arrangement and topography preclude a safer and more convenient change in direction of the motor vehicle.

Thus, although a U-turn is considered statistically dangerous a limited frequency thereof is tolerated because of practical concerns.

One cause for the large statistical incidence of U-turn collision is the lack of a perceptive index between an incipient U-turn and a left-hand turn. Typically, a present-day motor vehicle is equipped with turn signals by which the operator of the vehicle advises the following traffic of the prospective turn. Such signaling devices, however, do not distinguish between a left-hand turn and a full U-turn. Thus, those following the turning vehicle cannot anticipate the extent to which the vehicle is slowed down and, anticipating a left-turn only, do not accommodate the slower speed necessary to effect a U-turn with sufficient distance. (One should note that vehicle dynamics require a substantially slower rate when effecting a U-turn as opposed to a simple turn.)

In the past, various devices have been effected for displaying a message at the rear of a vehicle. Exemplary teachings of such devices are shown in U.S. Pat. Nos. 3,656,104; 3,678,457; 4,361,828; and 3,593,277. All of these prior art devices disclose various message techniques for a rear display in a motor vehicle requiring, however, extensive interconnection to the electrical wiring and the mechanical structure of the vehicle itself. Thus, while suitable for the purposes intended, each of the foregoing references describes a system entailing substantial in the installation thereof.

Installation convenience of signaling devices is a necessary aspect if it is intended for wide after-market acceptance and the foregoing techniques, therefore, lack such convenience. A conveniently installed signaling device, accordingly, is extensively sought in the art and it is one such device that is disclosed herein.

SUMMARY OF THE INVENTION

Accordingly, it is the general purpose and object of the present invention to provide a signaling system for use in a motor vehicle which is convenient in installation and in maintenance.

Other objects of the invention are to provide a signaling system useful with a motor vehicle wherein the power source therefor is both mechanically derived and solar energy charged.

Other objects of the invention are to provide a signaling system for a motor vehicle which requires no interconnection to the electrical circuits thereof.

Briefly, these and other objects are accomplished within the present invention by providing two manually actuated ultrasonic signal sources which may be adhesively attached or fixed to the spokes of the steering wheel of a motor vehicle and which, in response to manual articulation, will produce frequency coded ultrasonic sounds to an ultrasonic receiver adjacent the rear window of the vehicle. The ultrasonic receiver includes filtering circuits for discriminating the particular frequency code of the signal emitted by the signal sources and may be provided with a photovoltaic charging panel, turning on selected light sources in response to the code. For power the receiver circuit for charging the batteries thereof. Thus, in response to the one or the other frequency coded ultrasonic signal a message may then be displayed by the receiver at the rear of the vehicle.

This message may be in the form of the words "U-turn" along with directional arrows indicating the direction of the turn. To further improve the efficacy of the foregoing system directionally polarized signal reception may be provided in the receiver and pulse coding along with frequency coding may be utilized in the sources themselves.

In this manner, a signaling arrangement is devised which is wholly independent of the power and the electrical circuit of the motor vehicle and which thus is conveniently installed by the simple expedient of adhesive attachment.

DESCRIPTION OF THE SPECIFIC EMBODIMENT

Figure 1:
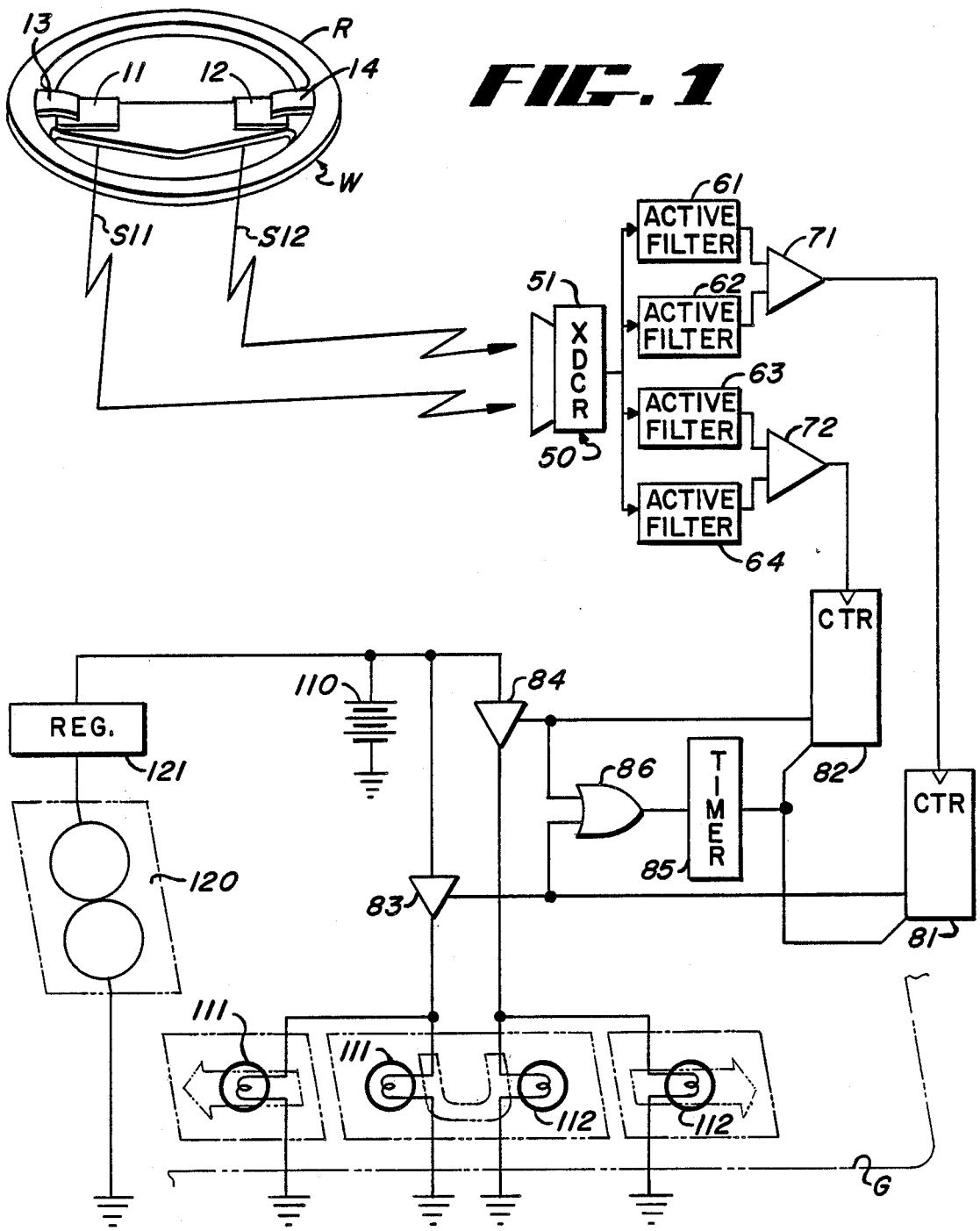
FIG. 1 is a diagrammatic illustration of the inventive signaling system in its operative state.
Figure 2:
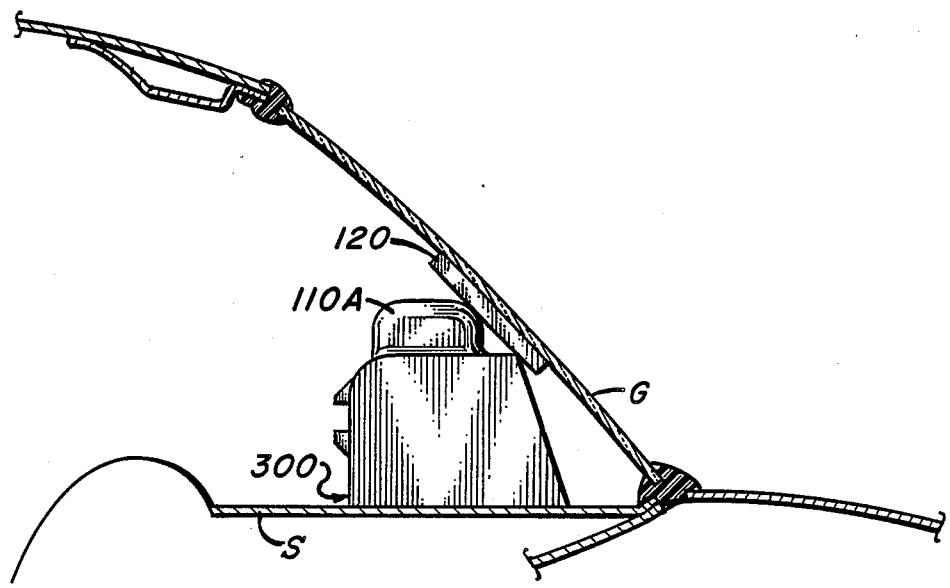
FIG. 2 is a side view detail, in partial section, of the receiving portion of the inventive system installed for use.
Figure 3:
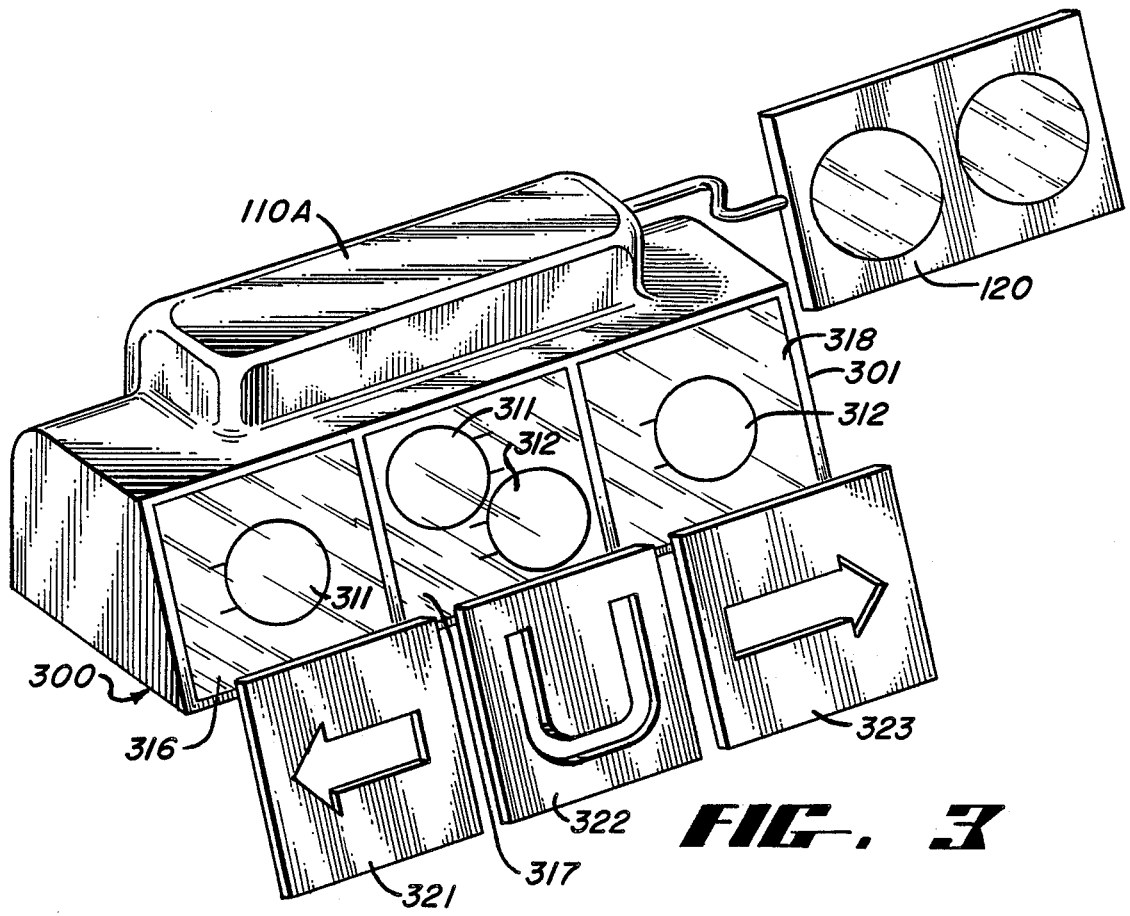
FIG. 3 is a perspective illustration, separated by parts, of a housing constructed according to the present invention.

As shown in FIGS. 1–3 the inventive system, generally designated by the numeral 10, comprises a left and right ultrasonic signal generator 11 and 12 adhesively fixed to the center bar of a conventional steering wheel W and aligned adjacent the rim R thereof for convenient manipulation by the operator's hands. Each of the ultrasonic signal sources 11 and 12, in accordance with the description following, are conformed to generate a corresponding ultrasonic signal S11 and S12 in response to the mechanical manipulation of respective levers 13 and 14 extending therefrom. Thus, direct mechanical energy effected by the operator is rendered useful to generate signals S11 and S12.

Signals S11 and S12 are preferrably signals in the ultrasonic signal domain, each comprising a characteristic set of ultrasonic signal frequencies otherwise known as frequency coding. Thus, signal S11, for example, may include two narrow signal frequencies at 30,000 and 45,000 Hz while signal S12 may be conformed as two, narrow, ultrasonic signals at 35,000 and 50,000 Hz. These signals S11 and S12 are then collected within a directional receiver horn assembly 50 affixed adjacent the rear window opening G of the motor vehicle and aligned towards the steering wheel W for directional filtering. Horn assembly 50, in turn, includes an ultrasonic pick-up 51 which, by its output, feeds four filter stages 61-64 in parallel. Filter stages 61-64 may be variously implemented, exemplified as well known, narrow band, active filter circuits conformed to pass the ultrasonic frequencies of signals S11 and S12. The outputs of filter stages 61 and 62 may then be collected in a differential comparator 71 which thus will produce at the output thereof a series of pulses conforming to the beat frequency between the individual signal frequencies of signal S11. This differential comparator is conformed to operate in open loop and therefore will swing across its reference and ground +V as a series of pulses. This series of pulses can be accummulated in a counter 81 and if a selected count is reached in counter 81 a gate 83 is enabled completing the circuit to a set of lights 111 from a battery source 110 which is continuously recharged by solar cells 120 adhered to the rear window glass G and controlled by a regulator 121.

In a similar manner, filters 63 and 64 are collected in a differential comparator 72 and the pulse output of comparator 72 is then accumulated in a counter 82 to enable a gate 84 in circuit with another set of lights 112.

Of course, counters 81 and 82 may be further connected for clear and reset to a common timer 85 set to recycle in fifteen seconds, and triggered by the output of an OR gate 86 collecting the signals from counters 81 and 82. Thus, once a signal pattern is initiated by way of the above-mentioned signal sources this pattern will stay on until the timer resets the corresponding counter. Counters 81 and 82, moreover, may be set to count intervals greater than a single beat count thus ensuring that only those signals intentionally emanated from the signal sources 11 and 12 will effect the switching.

Figure 4:
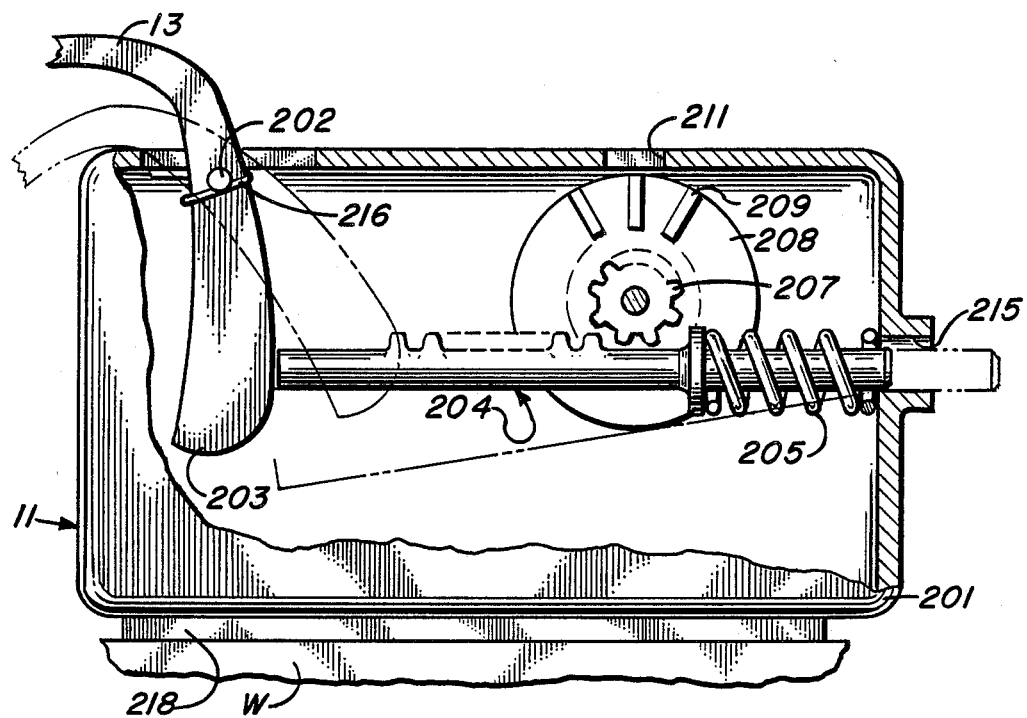
FIG. 4 is a side view, in partial section, of a mechanically operated ultrasonic signaling assembly in accordance with the present invention.
Figure 5:
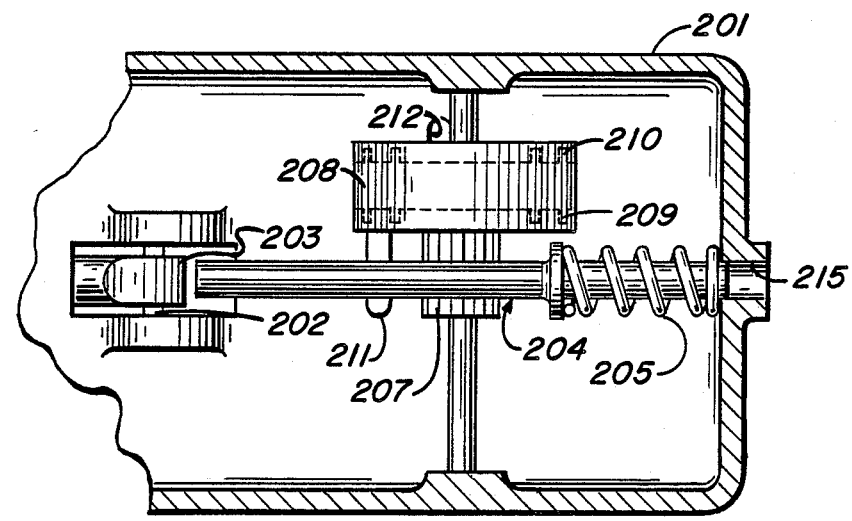
FIG. 5 is a sectional view taken along line 5—5 of FIG. 4.

By reference to FIGS. 4 and 5 signal source 11 (and by way of the same example signal 12) comprises a rectangular housing 201 from which the mechanical lever 13 extends from a pivot pin 202 engaging the juncture of the lever with a pole 203 abutting the end of a rack 204 inserted in a spring 205. Rack 204 aligns a toothed segment 206 adjacent a pinion 207 on an inertia wheel 208 provided with radial paddles 209 and 210 on either side thereof aligned adjacent slots 211 and 212 in the housing 201. At the ends of the toothed section 206 rack 204 is reduced in vertical dimension so that once the toothed section passes the pinion the inertia wheel is left to freewheel. Moreover, the reduced section allows displacement of the rack 204 into a guide drilling 215 and lateral motion when extended by flexing the helical spring 205. Thus the rack is free to return to its engagement position when the lever 13 is released. Lever 13 may be provided with a spring 216 to force such a returning alignment.

In this manner the selection of the linear dimensions of slots 211 and 212 and the spacing of vanes 209 and 210, together with the selection of the spring constant 205 and the inertia of the wheel 207 will insure the production of the ultrasonic frequencies hereindescribed. The foregoing assembly may then be adhesively affixed by way of a double-sided adhesive 218 to the center post of steering wheel W, as previously described.

In this form a mechanical device is implemented which by selective arrangement of lever lengths, spring constants, and inertias, insures the production of the desired ultrasonic frequencies which are passed by the filters. In consequence a signal unit, generally described by the numeral 300 and illustrated in FIGS. 2 and 3, is illuminated at selected portions thereof, with the particular signal or message displayed. Unit 300 may comprise the housing 301 segmented into three lateral partitions and provided with light apertures 321, 322 and 323 adjacent the bank of lights 311 and 312. Message aperture 321, for example, may overlie the left-most cavity in housing 301, shown as cavity 316, and may display a left-turn arrow when viewed from the rear of the vehicle. The center cavity 317, in turn, may include the message aperture "U" while the right cavity 318 may include an aperture indicating a right-hand arrow. Thus, by appropriate excitation of the lights 311 and 312 one or more of these apertures may be selectively illuminated.

The foregoing unit 300 may be adhesively secured onto the rear shelf S of the vehicle adjacent the glass G of the rear window and may be positioned with the solar cell 120 adhered to the glass and feeding to a battery housing 110A the photovoltaic output therefrom.

In this form a fully self-contained and conveniently installed system is provided by which various signals can be displayed to the following traffic. While the foregoing disclosure is particularly addressed as the signaling function of a U-turn, the function is exemplary only, and other signaling functions may be equally implemented.

Obviously many modifications and changes may be made to the foregoing description without departing from the spirit of the invention. It is therefore intended that the scope of the invention be determined solely on the claims appended hereto.

What is claimed is:

1. A signaling system conformed for use in a motor vehicle provided with a steering wheel and a rear window, comprising:
   ultrasonic signaling means conformed for adhesive attachment to said steering wheel and including mechanical articulation means for manual operation thereof for producing an ultrasonic signal;
   signal receiving means deployed in said vehicle proximate said rear window for receiving said ultrasonic signal from said signaling means for producing an enabling signal indicative thereof;
   a battery;
   a solar panel deployed adjacent said rear window and connected for charging said battery; and
   signaling means mounted in said vehicle adjacent said rear window and selectively electrically connected to said battery in response to said enabling signal.

2. Apparatus according to claim 1 wherein:
   said ultrasonic signaling means includes signal generating means for producing a first and a second ultrasonic signal; and
   said signal receiving means includes a first and second bandpass filter conformed to pass said first and second ultrasonic signal.

3. Apparatus according to claim 2 wherein:
   said signal receiving means, said battery and said signaling means are all received in a common housing.

4. Apparatus according to claim 3 wherein:
   said signaling means includes a light source and said housing includes a formed aperture adjacent said light source.

* * * * *